May 3, 1955    I. SILVERSTEIN ET AL    2,707,296
GLASS WASHING BRUSH ASSEMBLY
Filed Feb. 8, 1952

INVENTORS:
ISIDORE SILVERSTEIN
JEROME M. LIPSCHULTZ
VICTOR GENENDER
BY *Barnett + Barnett*
ATT'YS

2,707,296
GLASS WASHING BRUSH ASSEMBLY

Isidore Silverstein, Jerome M. Lipschultz, and Victor Genender, Chicago, Ill.

Application February 8, 1952, Serial No. 270,692

1 Claim. (Cl. 15—164)

This invention relates to new and useful improvements in glass washing brush assembly of the type adapted to be removably submerged in water and having a pair or more of spaced stationary tubular brushes over which an inverted glass tumbler is positioned and manually rotated to effect the washing or cleaning.

The brushes overlap so the inside and outside of the tumbler are washed simultaneously and are removable for replacement and rotatable for adjustment as portions of the brushes become worn.

In general, this type of brush is well known and in widespread use. However, this invention comprises certain improvements in details of construction whereby the brushes and base are removably secured together by non-corrosive elements and a spacer plate embedded in the base provides rigidity and effectiveness to the assembly. Heretofore, assemblies of this type have utilized metal screws or fastenings which become rusted so that the brushes cannot be removed for replacement or rotated for adjustment so the entire assembly must be replaced.

The primary object of this invention is to provide an assembly of this type which will not be permanently affected by its constant submergence in water so that the brushes may be readily adjusted or removed for replacement when needed.

Another object of this invention is to provide such an assembly with a molded rubber base having threaded sockets which cannot be substantially distorted.

A further object of this invention is to provide such an assembly in which the brushes will be securely held in desired relative positions at all times.

Still a further object of this invention is to provide replaceable brushes for such an assembly which may be made simply and inexpensively.

Other objects and advantages will be apparent from the following detailed specification.

Figure 1:
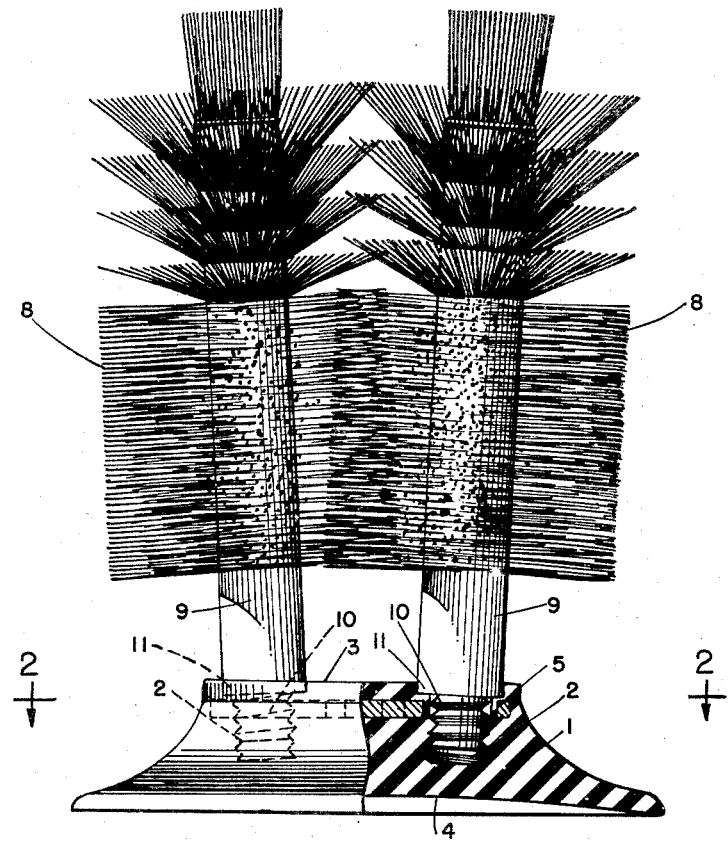
Fig. 1 is a side elevational view, partly in cross section, of a glass washing brush assembly embodying this invention.
Figure 2:
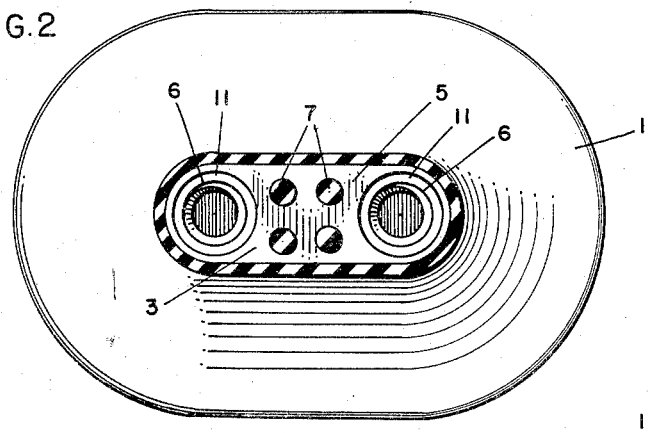
Fig. 2 is a sectional view taken on line 2—2 of Fig. 1.

In detail, the device comprises a molded rubber base 1, provided with threaded sockets 2, extending downwardly from the upper surface 3 thereof. The bottom surface of base 1 is cupped, as at 4, so that the assembly may be removably secured at a desired point by suction. Embedded in the base 1, adjacent the top surface 3, is a metal plate 5 provided with two large holes 6 at each end, of slightly greater diameter than the largest diameter of the threaded sockets 2. The holes 6 are spaced apart so as to align with the sockets 2 when positioned thereon and embedded therein. Four smaller holes 7 are positioned in plate 5 between the two holes 6.

In manufacturing base 1, rubber or similar material is poured into a mold of required configuration and formed with four indentations at its tops so as to form four protrusions on the upper surface of the rubber. These are so positioned that they, in cooperation with the four holes 7 in plate 5, will center the plate 5 with the holes 6 aligned with sockets 2. After plate 5 is so positioned, a second pouring of rubber embeds it in the base 1 and finishes off the top surface 3. The plate 5 is preferably entirely embedded in the base 1 so that none of it is exposed to water when in use but if in manufacture or use small portions are left or become exposed the usefulness of the assembly will not be affected materially.

A pair of tubular brushes 8 are mounted on cylindrical wooden spindles 9, the lower ends of which are threaded at 10, of similar size as the threads of sockets 2.

It should be noted that the upper portions of sockets 2 are enlarged as at 11 to about the diameter of the cylindrical unthreaded parts of spindles 9 to provide shallow, unthreaded sockets for the portions of spindles 9 immediately adjacent the threaded portions 10. This permits these portions of spindles 9 to become slightly embedded in the upper surface 3 of base 1 when in assembled position and be held adjacent the upper surface of plate 5 to increase the rigidity of the whole assembly.

The plate 5 also prevents distortion of the sockets 2 and maintains them in constant spaced relation so that the brushes 8 are firmly held in the base 1 by the cooperating threads of sockets 2 and spindles 9 and are also held against movement away from their relative operative positions. Plate 5 furthermore provides additional support for the brushes 8 because of its substantially abutting contact with the lower unthreaded parts of spindles 9 when brushes 8 have been screwed into assembled position.

In operation, the assembly is submerged in water in a sink, the suction cup bottom 4 of base 1 holding it in the desired position. The water will cause the threaded ends 10 of the wooden spindles 9 to swell, somewhat, to increase the attachment of the brushes 8 to the base 1. When it is desired to rotatably adjust or remove the brushes, upon wear, the assembly is removed from the water, placed in upside down position and allowed to drain and dry. The threaded ends 10 will, when dry, contract to about normal size and the brushes may be manually rotated to new positions or unscrewed for replacement.

Obviously the improvements and inventions herein described are not limited to such an assembly having only two brushes as they may readily be adapted to the construction of such an assembly having three or more brushes, the necessary changes being apparent to anyone skilled in the art. Furthermore, it is apparent that other methods of embedding the plate in the base may be used without departing from the invention, the example given being merely illustrative.

We claim:

A glass washing brush assembly comprising a base molded of resilient material, threaded sockets molded in the upper surface of the base, a spacer plate embedded in the base near the upper surface thereof surrounding the sockets and extending therebetween, unthreaded sockets aligned with the threaded sockets and of greater diameter and extending from the upper surface of the base to adjacent the upper surface of the embedded plate, and brushes having wooden spindles of diameter about that of said unthreaded sockets, said spindles having threaded ends, said threaded ends removably positioned within said threaded sockets, the lower unthreaded parts of said spindles being positioned in said unthreaded sockets.

References Cited in the file of this patent
UNITED STATES PATENTS

| | | |
|---|---|---|
| 1,083,829 | Hatosy | Jan. 6, 1914 |
| 2,263,256 | Kapinos | Nov. 18, 1941 |
| 2,499,274 | Linnit | Feb. 28, 1950 |
| 2,556,003 | Sandell | June 5, 1951 |